(12) United States Patent
Mosier et al.

(10) Patent No.: US 8,316,357 B2
(45) Date of Patent: Nov. 20, 2012

(54) TYPE DESCRIPTOR MANAGEMENT FOR FROZEN OBJECTS

(75) Inventors: Scott D. Mosier, North Bend, WA (US);
Peter F. Sollich, Bavaria (DE); Frank V. Peschel-Gallee, Kirkland, WA (US);
Patrick H. Dussud, Redmond, WA (US); Simon J. Hall, Seattle, WA (US);
Rudi Martin, Snohomish, WA (US);
Michael M. Magruder, Carnation, WA (US); Andrew Pardoe, Bellevue, WA (US); Madhusudhan Talluri, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 12/203,857

(22) Filed: Sep. 3, 2008

(65) Prior Publication Data

US 2010/0058304 A1    Mar. 4, 2010

(51) Int. Cl.
*G06F 9/45* (2006.01)
(52) U.S. Cl. ......... 717/140; 717/154; 717/155; 717/159
(58) Field of Classification Search .................. None
See application file for complete search history.

(56) References Cited

U.S. PATENT DOCUMENTS

| | | | |
|---|---|---|---|
| 5,247,674 A | 9/1993 | Kogure | |
| 5,970,496 A | 10/1999 | Katzenberger | |
| 6,061,520 A | 5/2000 | Yellin et al. | |
| 7,010,783 B2 | 3/2006 | de Jong | |
| 7,036,118 B1 * | 4/2006 | Ulery et al. | 717/159 |
| 7,111,279 B2 | 9/2006 | Gazdik et al. | |
| 7,124,291 B1 | 10/2006 | Fresko | |
| 7,353,507 B2 | 4/2008 | Gazdik et al. | |
| 7,685,261 B1 * | 3/2010 | Marinelli et al. | 709/220 |
| 7,711,708 B2 * | 5/2010 | Bergstraesser et al. | 707/638 |
| 7,716,190 B2 * | 5/2010 | Mendis et al. | 707/694 |
| 7,805,495 B2 * | 9/2010 | Marmaros | 709/217 |
| 7,809,745 B2 * | 10/2010 | Elango et al. | 707/765 |
| 8,015,556 B2 * | 9/2011 | Cui et al. | 717/154 |
| 2003/0046670 A1 * | 3/2003 | Marlow | 717/140 |
| 2003/0140058 A1 * | 7/2003 | Martin et al. | 707/103 R |
| 2004/0088683 A1 * | 5/2004 | Gazdik et al. | 717/133 |
| 2005/0086642 A1 * | 4/2005 | Runte et al. | 717/122 |
| 2005/0091240 A1 * | 4/2005 | Berkowitz et al. | 707/100 |
| 2005/0262107 A1 * | 11/2005 | Bergstraesser et al. | 707/100 |
| 2006/0224967 A1 * | 10/2006 | Marmaros | 715/738 |

(Continued)

OTHER PUBLICATIONS

Jack Shirazi, Java Performance Tuning, Sep. 2000, O'Reilly, 21 pages, <http://oreilly.com/catalog/javapt/chapter/ch04.html>.*

(Continued)

*Primary Examiner* — Thuy Dao
*Assistant Examiner* — Cuong V Luu
(74) *Attorney, Agent, or Firm* — Workman Nydegger

(57) ABSTRACT

The efficient use of type descriptors with frozen objects. A frozen object might actually include several type descriptors, a primary type descriptor that is canonical according to a set of canonicalization rules, and an auxiliary type descriptor that is not identical to the primary type descriptor. The auxiliary type descriptor may be used to access the canonical type descriptor. When performing an operation, if the auxiliary type descriptor can be used to perform the operation, then that auxiliary type descriptor may be used. If the canonical type descriptor is to be used to perform the operation, the auxiliary type descriptor is used to gain access to the canonical primary type descriptor. The primary type descriptor is then used to perform the operation.

17 Claims, 3 Drawing Sheets

U.S. PATENT DOCUMENTS

| | | | |
|---|---|---|---|
| 2007/0028223 | A1* | 2/2007 | Meijer et al. .................. 717/140 |
| 2008/0052687 | A1* | 2/2008 | Gonzales-Tuchmann et al. ............................ 717/140 |
| 2008/0127129 | A1* | 5/2008 | Langworthy et al. ......... 717/140 |
| 2009/0043753 | A1* | 2/2009 | Elango et al. .................... 707/5 |
| 2009/0049430 | A1* | 2/2009 | Pai et al. ........................ 717/140 |
| 2009/0070753 | A1* | 3/2009 | Chen et al. .................... 717/155 |
| 2009/0080408 | A1* | 3/2009 | Natoli et al. .................. 370/351 |

OTHER PUBLICATIONS

Ryuhei Uehara, "Canonical Data Structure for Interval Probe Graphs", Springer-Verlag Berlin Heidelberg 2004, pp. 859-870, <http://www.springerlink.com/content/w8t96ekwmjvy2klm/fulltext.pdf>.*

Tarek Branki, "A Terminological Canonical Data Model for Cooperating Heterogeneous Geographical Information Systems", pp. 28-37, springerLink 1997, <http://www.springerlink.com/content/5v2436733mj60m67/fulltext.pdf>.*

Brahim Medjahed et al., "Business-to-business interactions: issues and enabling technologies", The VLDB Journal 2003, pp. 59-85, <http://dl.acm.org/citation.cfm?id=775452.775457>.*

R. A. Demers et al, "Data description and conversion architecture", IBM Systems Journal, vol. 31, No. 3, 1992, pp. 488-515, <http://ieeexplore.ieee.org/stamp/stamp.jsp?tp=&arnumber=5387428>.*

M. E. Senko, "Data structures and data accessing in data base systems past, present, future", IBM System Journal, Nov. 1977, pp. 208-257, <http://ieeexplore.ieee.org/stamp/stamp.jsp?tp=&arnumber=5388046>.*

Li Weng et al., "An Approach for Automatic Data Virtualization", 2004 IEEE, pp. 24-33, <http://ieeexplore.ieee.org/stamp/stamp.jsp?tp=&arnumber=1323476>.*

Understanding the Import Address Table (4 pages) http://sandsprite.com/CodeStuff/Understanding_imports.html, Jul. 3, 2008. 4 pages.

* cited by examiner

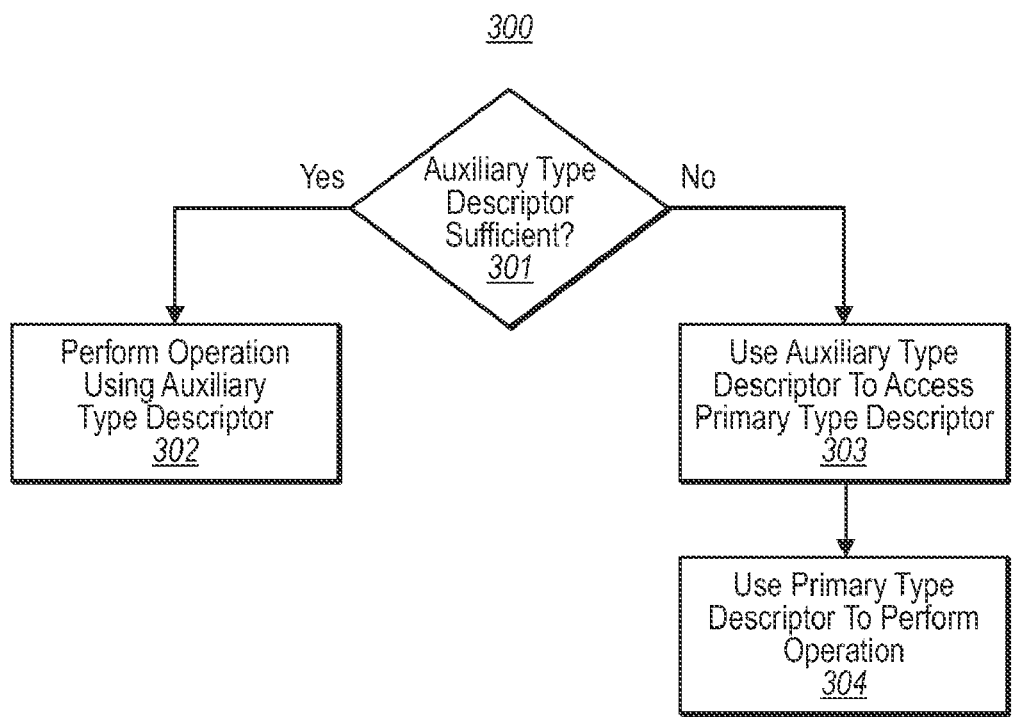
FIG. 3
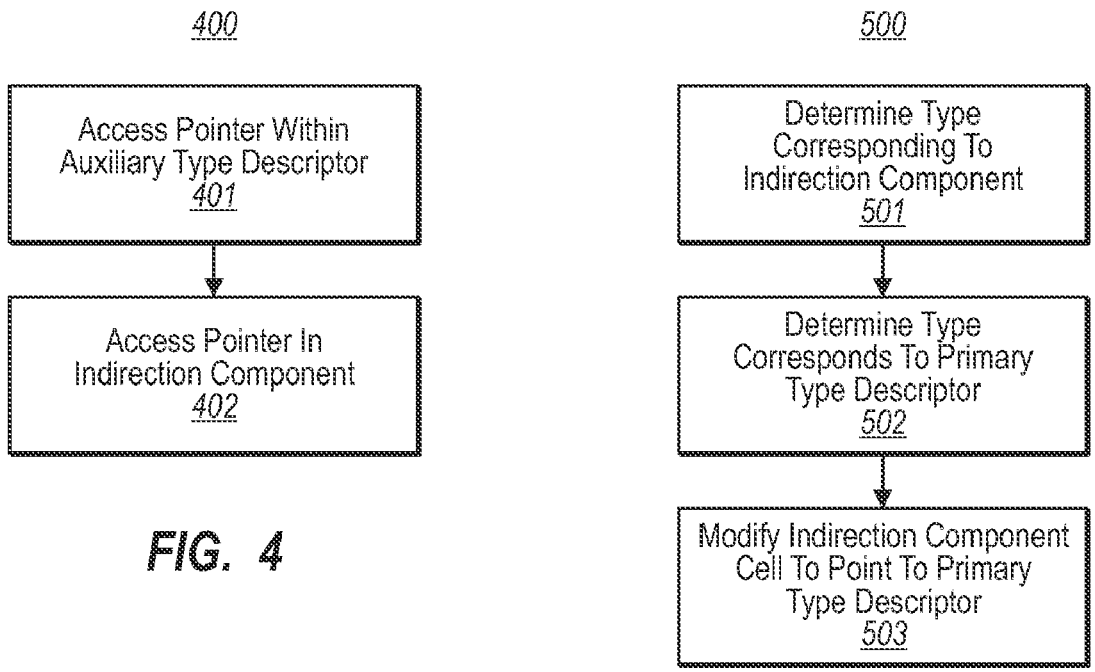
FIG. 4
FIG. 5

TYPE DESCRIPTOR MANAGEMENT FOR FROZEN OBJECTS

BACKGROUND

The most fundamental building block of object-oriented programming is called an "object". Generally speaking, an object has zero or more methods and zero or more member fields. Accordingly, in order to be properly interpreted by a computing system, the object should be of a particular type understood by the computing system. Primitive types include types that are provided by the programming language itself as basic building blocks for the programmer. Examples of primitive types might include a character, a string, an integer, a floating point number, an array, and so forth. Programming languages typically allow programmers to construct composite types that represent a combination of constituent types, whether those constituent types are primitive types or other composite types. Such composite types can be quite complex.

It is often advantageous to know the type of a particular object. Accordingly, in memory during execution time, an object often has an associated type descriptor. In one example, the object has a type description pointer that points to a more complete type descriptor. The type descriptor might be used for a variety of purposes. For one, the type descriptor for an object may be evaluated in order to verify that a particular operation may be performed by the object, or to determine that the object is of the same or equivalent type as another object.

One particular kind of object is called a "frozen object". A frozen object instance is one whose layout is completed at compile time and is included as part of the compiled image. Objects that are not subject to extensive or perhaps any change during run-time are perhaps the best candidates for object freezing, but any object instance with pre-initialized data may be frozen. For instance, a calendar program might provide a daily inspirational quote selected from amongst 1000 predetermined quotes. Each of those 1000 predetermined quote may be represented in a frozen object of type string. Instructions within the module may refer to the frozen object. At run-time, the frozen object is loaded into memory along with much or all of the other portions of the module. However, there would be no need to newly allocate the frozen object at run-time.

BRIEF SUMMARY

Embodiments described herein related to the efficient use of type descriptors with frozen objects. In one embodiment, a frozen object might actually include several type descriptors, a primary type descriptor that is canonical according to a set of canonicalization rules, and an auxiliary type descriptor that is not identical to the primary type descriptor. The auxiliary type descriptor may be used to access the canonical type descriptor. When performing an operation, if the auxiliary type descriptor can be used to perform the operation, then that auxiliary type descriptor is used to perform the operation. If the canonical primary type descriptor is to be used to perform the operation, the auxiliary type descriptor is used to gain access to the canonical primary type descriptor. The primary type descriptor is then used to perform the operation.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 3 illustrates a flowchart of a method for performing one or more type operations using multiple type descriptors corresponding to the frozen object;

FIG. 4 illustrates a flowchart of an example method of using the auxiliary type descriptor to access the canonical type descriptor; and FIG. 5 illustrates a flowchart of a method for preparing to use the indirection component to allow access to the canonical type descriptor.

DETAILED DESCRIPTION

In accordance with embodiments described herein, the principles described herein allow for the efficient use of type descriptors with frozen objects. First, various embodiments of a computing system in which the principles described herein may be employed. Then, various embodiments of the use of type descriptors used with frozen objects will be described with respect to FIGS. 2 through 5.

Figure 1:
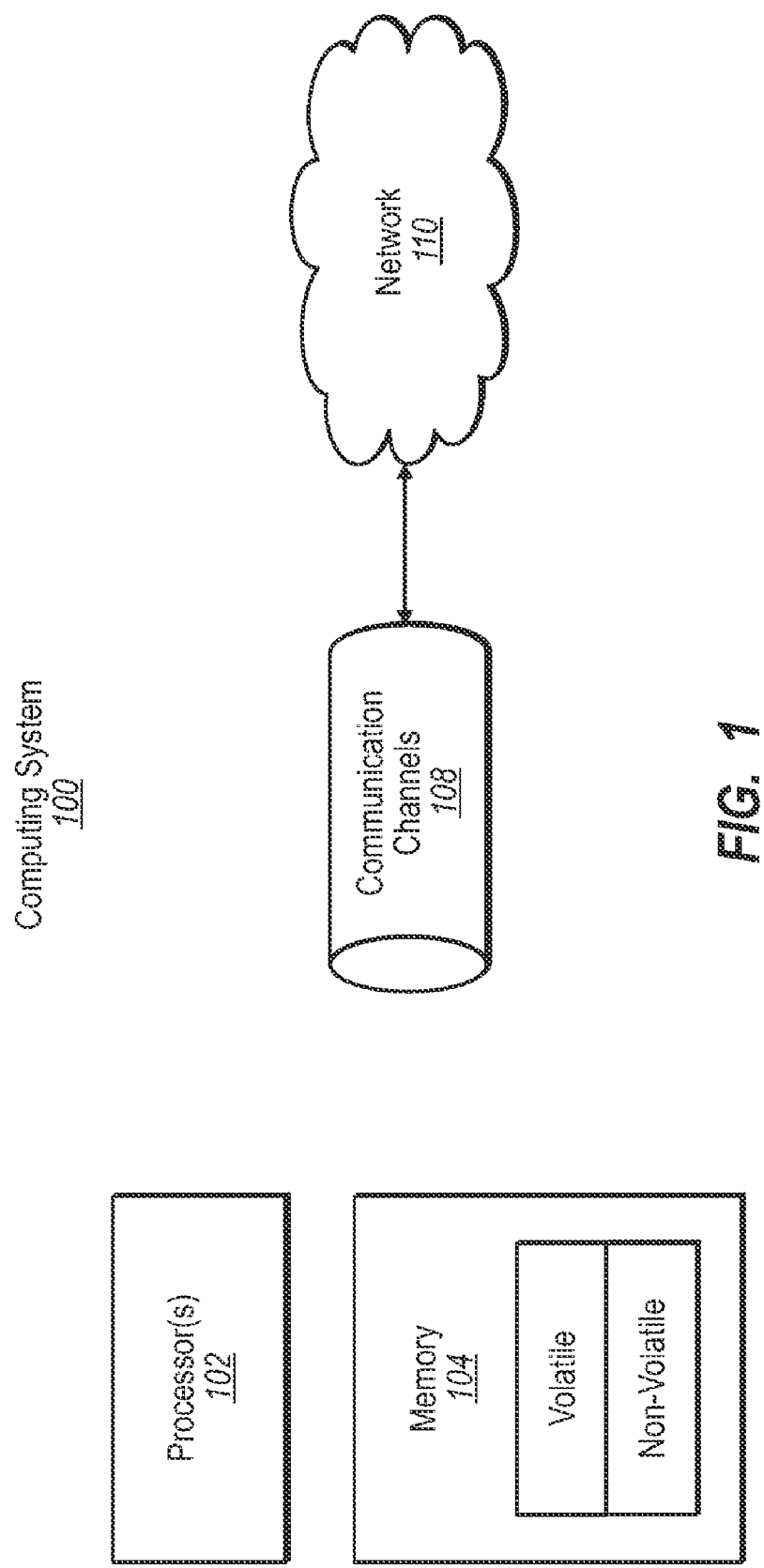
FIG. 1 illustrates a computing system that may implement one of more features described herein.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
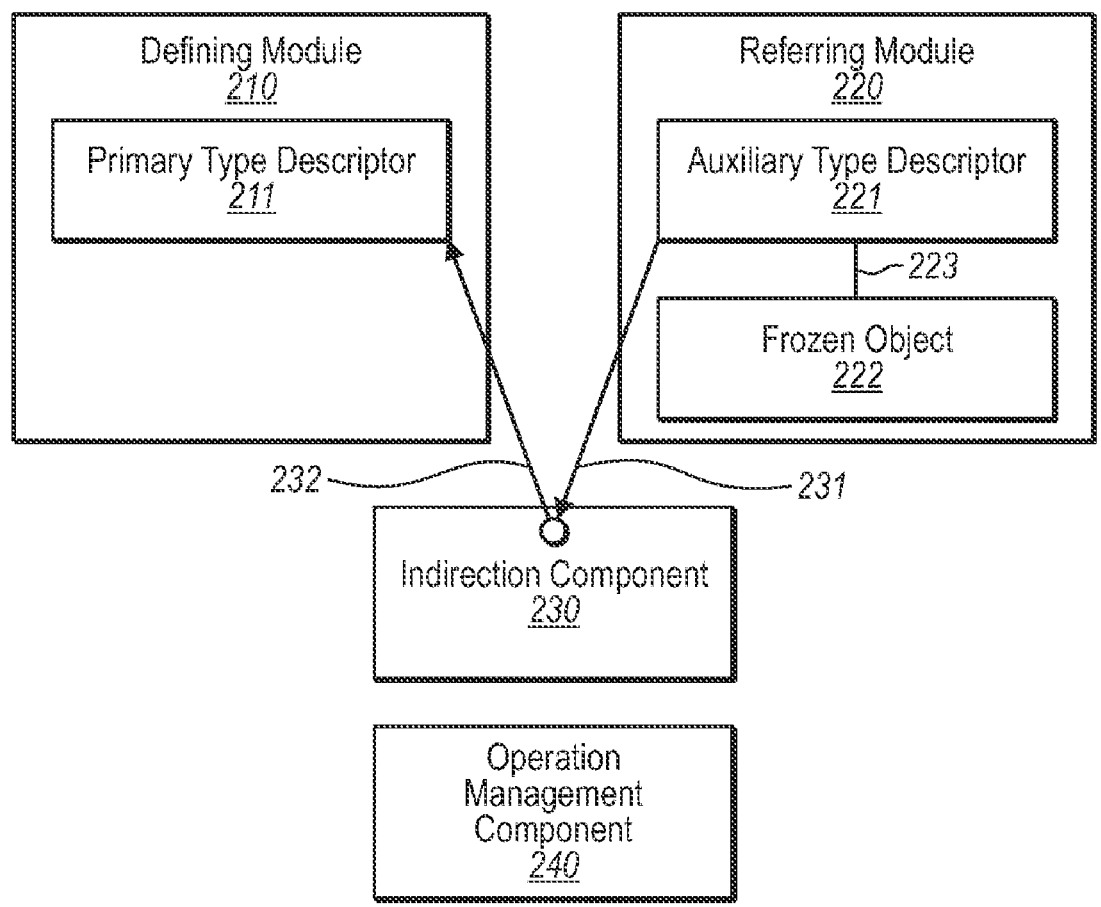
FIG. 2 illustrates an architecture in which type descriptions may be used with frozen objects.

FIG. 2 illustrates an architecture 200 in which type descriptions may be efficiently used with frozen objects. As previously mentioned, a "frozen object" is an object that is allocated at compile-time, and thus exists as an object in the compiled executable file. Accordingly, at load-time in preparation for execution, the frozen object is loaded into memory along with potentially other portions or perhaps all of the other components of the image file. Often, it might be static data that may be represented in a frozen object. That said, the principles described herein are not limited to the use of frozen objects that are not modified once loaded into memory. However, some embodiments herein reduce or eliminate the need to write to the in-memory representations of the frozen objects. This is advantageous since writing to memory can cause the portions (called pages) of the memory that have been written to be made "private". That is, the process that wrote to that page forces a private copy of the page to be created.

The architecture 200 includes a defining module 210 and a referring module 220. In this description, the "modules" may be executable images loaded into memory. For instance, referring to FIGS. 1 and 2, the modules 210 and 220 may be loaded into the memory (the volatile portion of memory 104) from storage (the non-volatile portion of the memory 104).

The defining module 210 is termed "defining" since it contains a primary type descriptor 211 that corresponds to and defines a particular type. In one embodiment, the primary type descriptor 211 defines the particular type in a manner that satisfies a set of canonicalization rules. There may be canonicalized type descriptors for other types as well. However, to avoid undue complication of FIG. 2, the type descriptors for only one type are illustrated.

The referring module 220 is termed "referring" since it contains a frozen object 222 that is of the type defined by the primary type descriptor. The referring module 220 thus in a sense indirectly refers to the primary type descriptor in the primary module 210. In particular, the referring module 220 includes an auxiliary type descriptor 221 corresponding to and defining the same particular type that is defined by the primary type descriptor 211. The referring module 220 also includes sufficient information to provide an association 223 between the frozen object 222 and the auxiliary type descriptor 221.

The auxiliary type descriptor 221 is not identical to the canonical primary type descriptor 211. For instance, the auxiliary type descriptor 221 may not be a canonical type descriptor in the sense that it might not follow every canonical rule in the set of canonical rules followed by the primary type descriptor 211. In one embodiment, however, the auxiliary type descriptor 221 might essentially be a cloned copy of the primary type descriptor 211, except with perhaps sufficient information to distinguish the primary and auxiliary type descriptors from each other. In another embodiment, the auxiliary type descriptor 221 includes sufficient information such that at least one type operation may be performed with the auxiliary type descriptor 221, rather than having to refer to the canonical primary type descriptor 211.

The association 223 between the frozen object 222 and the auxiliary type descriptor 221 may be, for example, a type description pointer in the frozen object itself. For instance, in an embodiment in which the object begins with a type description pointer, the frozen object may also begin with a type description pointer. However, instead of pointing to the primary type descriptor, the frozen object 222 points to the auxiliary type descriptor 221. If the primary type descriptor 211 were included in the module 220 instead, the frozen object 221 might instead directly point to the primary type descriptor 211. However, at the time the referring module 220 was compiled, there might not be sufficient information to having the frozen object point directly to a primary type descriptor in a different module.

The architecture 200 also includes an indirection component 230 through which the auxiliary type descriptor 221 is associated with the primary type descriptor 211. In one embodiment, the indirection component 230 is an import address table and may even be part of the referring module 220 itself. One cell of the import address table may be used as a point of indirection between the primary type descriptor 211 and the auxiliary type descriptor 221. Although only one type is illustrated in FIG. 2, the indirection component may be used for multiple types.

In one embodiment, the indirection component 230 is used to associate the two type descriptors as follows. First, potentially at compile-time, the auxiliary type descriptor includes some indication that the type descriptor is auxiliary, and not primary. This means that one of the fields of the auxiliary type descriptor 221 is modified to include a pointer to the corresponding portion of the indirection component 230 as represented by arrow 231. At run-time, the appropriate portion of the indirection component 230 is then modified to include a pointer (represented by arrow 232) to the corresponding primary type descriptor 211. Thus, using the pointers in the auxiliary type description 221 and the indirection component 230, the auxiliary type descriptor 221 may be used to access the primary type descriptor 211. In addition, to the extent that the auxiliary type descriptor in the same module as the frozen object may be used to perform a type operation on the frozen object, only one level of indirection is used to access the auxiliary type descriptor.

In one embodiment, the indirection component may be written to perhaps only once, without rendering as private those pages written to. Even if a write operation does render private the portion of the indirection component written to, the indirection component 230 may be clustered into a fewer number of pages. Accordingly, fewer pages might be made private as compared to a situation in which a similar number of writes were to be made to the more spread out type description pointers in the module 220 itself.

The environment 200 also includes an operations management component 240 that performs type operations. In so doing, the operations management component determines whether the auxiliary type descriptor is sufficient to perform the type operation, or whether the primary type descriptor is needed to perform the type operation. As an example, FIG. 3 illustrates a flowchart of a method 300 for performing one or more type operations using multiple type descriptors corresponding to the frozen object. For example, if the frozen object was the frozen object 222 of FIG. 2, the multiple type descriptions would include the primary type descriptor 211 and the auxiliary type descriptor 221. In one embodiment, the operations management component 240 may simply be an application, operating system or portions thereof.

First, for each operation, the component 240 determines whether the auxiliary type descriptor will be sufficient to perform the operation (decision block 301). For one of more type operations, it may be determined that the auxiliary type descriptor will be sufficient to perform the operation (Yes in decision block 301). In that case, the operation is performed using the auxiliary type descriptor (act 302). In some cases, the type operation may require that there only be one level of indirection between the frozen object and the type description. The pointer from the frozen object to the auxiliary type descriptor represents that one level of indirection in that case. Thus, these operations may be performed without undue added complexity to access the primary type descriptor through additional indirection.

Examples of type operations that might be performed using just the auxiliary type descriptor and that might expect just one level of indirection between the object and the type descriptor include a virtual-call operation or an interface-call operation. In addition, type comparisons between two objects may in some cases be made by comparing the type descriptor pointers in each object. If the pointers match, then regardless of whether they both point to a primary type descriptor, or an auxiliary type descriptor, they refer to the same type. In one embodiment, a significant percentage of all of the type operations that are performed may be satisfied by using just the auxiliary type descriptor. Accordingly, these operations may be performed quite efficiently without having to even find the primary type descriptor.

For one or more other operations, it may be determined that the auxiliary type descriptor will not be sufficient to perform the operation (No in decision block 301). In that case, the auxiliary type descriptor is used to access the canonical primary type descriptor (act 303). Then, the primary type descriptor may be used to perform the operation (act 304). As an example of a type operation that might require access to the primary type descriptor, suppose a type comparison operation is once again being performed between two objects. However, in this case, if the type descriptor pointers do not match, and it is determined that at least one of the objects points to an auxiliary type descriptor, then the primary type descriptor corresponding to any auxiliary type descriptors is accessed, and the primary type descriptors are used to verify a type match. In one embodiment, the percentage of type operations that is needed to access the primary type descriptor may be relatively small compared to the percentage of type operations that can complete using just the auxiliary type descriptor.

FIG. 4 illustrates a flowchart of an example method 400 of using the auxiliary type descriptor to access the canonical type descriptor. There are other methods that may be employed to access the primary type descriptor from the auxiliary type descriptor. However, the method 400 is suitable as an example.

The pointer within the auxiliary type descriptor is accessed (act 401). That pointer points directly or indirectly to the primary type descriptor. For instance, in the case of FIG. 2, the pointer of the auxiliary type descriptor points (as represented by arrow 231) to the appropriate cell in the indirection component. The pointer that is in the cell of the indirection component (see arrow 232) is then used to access the primary canonical type descriptor (act 402).

Thus, type descriptors can be effectively used even if multiple type descriptors correspond to a single object, and even if the primary type descriptor for a particular object resides outside of the module in which the frozen object is allocated. Furthermore, by consolidating write operations to an indirection component, write operations may be more consolidated at run-time, thereby minimizing, and potentially eliminating privatization of pages due to such write operations.

FIG. 5 illustrates a flowchart of a method 500 for preparing to use the indirection component to allow access to the canonical type descriptor. This method 500 may be performed at load-time in preparation for execution. Prior to performing the method, at compile time, the pointer from the frozen object to the auxiliary type descriptor, and the pointer from the auxiliary type descriptor to the indirection component may have already been set. However, to complete the indirection path to primary type descriptor, a pointer is set from the indirection component to the primary type descriptor.

To do this, the type that corresponds to the appropriate cell of the indirection component is determined (act 501). It is then determined that this type corresponds to a primary type descriptor (act 502). In response to this matching operation, the indirection component is then modified to include the pointer to the as canonical type descriptor (act 503). Thus, in this embodiment, part of the indirection path is created during compile-time, and the final portion of the indirection path is created at run-time. This permits flexibility at deployment in the locations of the primary type descriptors with respect to the frozen objects in other executable modules. Thus, as long as there is a primary type descriptor somewhere in a collection of executable modules, a frozen object anywhere in the collection may properly refer, even if indirectly, to the primary type descriptor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing one or more type operations using a plurality of type descriptors, the plurality of type descriptors including a canonical type descriptor that conforms to a set of canonicalization rules and an auxiliary type descriptor, the canonical type descriptor and auxiliary type descriptor being distinct and both being associated with a frozen object, the frozen object having a layout that is completed at compile time and allocated at compile time and thereby existing as an object in a compiled executable first module, the first module including both the frozen object and the auxiliary type descriptor, the method being performed upon one or more computer processors, the method comprising:

an indirection component through which the auxiliary type descriptor is associated with the canonical type descriptor, wherein the indirection component is a component that may be written to at run-time to thereby cause the indirection component to point to the canonicalized type descriptor without causing the indirection component or a portion thereof to become private;

for a first set of one of more operations,
    an act of determining that the auxiliary type descriptor within the first module will be sufficient to perform the operation, and
    an act of using the auxiliary type descriptor, and not the canonical type descriptor, to perform the operation; and for a second set of one or more operations,
    an act of determining that the auxiliary type descriptor will not be sufficient to perform the operation,
    an act of using the auxiliary type descriptor to access the canonical type descriptor, wherein the canonical type descriptor is included in a second module, and
    an act of using the canonical type descriptor within the second module to perform the operation.

2. A method in accordance with claim 1, wherein the act of using the auxiliary type descriptor to access the canonical type descriptor comprises:
    an act of accessing a pointer within the auxiliary type descriptor, wherein the pointer points directly or indirectly to the canonical type descriptor.

3. A method in accordance with claim 1, wherein the act of using the auxiliary type descriptor to access the canonical type descriptor comprises:
    an act of accessing a pointer within the auxiliary type descriptor, wherein the pointer points directly or indirectly to the indirection component that includes a pointer that points directly or indirectly to the canonical type descriptor; and
    an act of using the pointer that is in the indirection component to access the canonical type descriptor.

4. A method in accordance with claim 3, further comprising an act of preparing to use the indirection component to allow access to the canonical type descriptor.

5. A method in accordance with claim 4, wherein the act of preparing comprises:
    an act of determining a type that corresponds to the indirection component;
    an act of determining that the type corresponds to the canonical type descriptor; and
    an act of modifying the indirection component to include the pointer to the canonical type descriptor.

6. A method in accordance with claim 1, wherein at least one of the second set of operations includes a comparison of a type of the frozen object to the type of another object.

7. A method in accordance with claim 1, wherein at least one of the first set of operations requires that there only be one level of indirection between the frozen object and the type descriptor that is used to perform the operation.

8. A method in accordance with claim 1, wherein at least one of the first set of operations is a virtual-call operation.

9. A method in accordance with claim 1, wherein at least one of the first set of operations is an interface-call operation.

10. A computer program product comprising one or more computer-readable physical storage media having thereon an executable module, the executable module comprising:
    a frozen object that is an instance of a type canonically described by a canonical type descriptor that conforms to a set of canonicalization rules, the frozen object having a layout that is completed at compile time and being allocated at compile time and thereby existing as an object in the executable module;
    an auxiliary type descriptor that is distinct from and not identical to the canonical type descriptor, but that also serves as a type descriptor for the frozen object for at least some operations associated with the frozen object that use type descriptors for the type;
    wherein the frozen object is associated with the auxiliary type descriptor within the executable module, wherein the frozen object is associated with the canonical type descriptor by an indirection component through the auxiliary type descriptor, wherein the canonical type descriptor is in a module distinct from and external to the executable module, and wherein the indirection component is a component that may be written to at run-time to thereby cause the indirection component to point to the canonicalized type descriptor without causing the indirection component or a portion thereof to become private.

11. A computer program product in accordance with claim 10, wherein the canonical type descriptor is not present within the executable module.

12. A computer program product in accordance with claim 11, wherein the canonical type descriptor is present on the computer program product.

13. A computer program product in accordance with claim 10, wherein the frozen object is associated with the auxiliary type descriptor by including a pointer that points to the auxiliary type descriptor.

14. A computer program product in accordance with claim 10, wherein the indirection component is a component that may be written to once at run-time to thereby cause the indirection component to point to the canonicalized type descriptor without causing the indirection component or a portion thereof to become private.

15. A computer program product in accordance with claim 10, wherein the indirection component is an import address table.

16. A computer program product comprising one or more computer-readable physical storage media having thereon the following:
    a defining module that includes a first compiled image that contains a primary type descriptor corresponding to a type;

a referring module that includes a second compiled image that contains a frozen object, an auxiliary type descriptor, and an association between the frozen object and the auxiliary type descriptor, the frozen object having a layout that is completed at compile time and is allocated at compile time, wherein the defining module and the referring module are separate and distinct modules;

an indirection component through which the auxiliary type descriptor is associated with the primary type descriptor, wherein the indirection component is a component that may be written to at run-time to thereby cause the indirection component to point to the primary type descriptor without causing the indirection component or a portion thereof to become private; and an operations management component that is configured to determine whether the auxiliary type descriptor is sufficient to perform an operation or whether the primary type descriptor is needed to perform the operation, and when it is determined that the primary type descriptor is needed, using the auxiliary type descriptor in the referring module to locate and access the primary type descriptor within the defining module through the indirection component.

17. A computer program product in accordance with claim 16, wherein the indirection component may be modified at least once without making any portion of the indirection component private.

* * * * *